US011874829B2

(12) United States Patent
Kreutzer et al.

(10) Patent No.: US 11,874,829 B2
(45) Date of Patent: Jan. 16, 2024

(54) QUERY EXECUTION ACROSS MULTIPLE GRAPHS

(71) Applicant: Microsoft Technology Licensing, LLC, Redmond, WA (US)

(72) Inventors: Tor Kreutzer, Tromsø (NO); Amund Kronen Johansen, Tromsø (NO); Steffen Viken Valvåg, Tromsø (NO); Åge Kvalnes, Tromsø (NO); Jan-Ove Karlberg, Tromsø (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/532,395

(22) Filed: Nov. 22, 2021

(65) Prior Publication Data

US 2022/0083550 A1    Mar. 17, 2022

Related U.S. Application Data

(63) Continuation of application No. 15/493,761, filed on Apr. 21, 2017, now Pat. No. 11,243,949.

(51) Int. Cl.
*G06F 16/2453* (2019.01)
*G06F 16/901* (2019.01)
*G06F 16/2458* (2019.01)

(52) U.S. Cl.
CPC .... *G06F 16/24542* (2019.01); *G06F 16/2471* (2019.01); *G06F 16/9024* (2019.01)

(58) Field of Classification Search
CPC .......... G06F 16/24542; G06F 16/2471; G06F 16/9024
See application file for complete search history.

(56) References Cited

U.S. PATENT DOCUMENTS

| | | | |
|---|---|---|---|
| 2003/0120682 A1* | 6/2003 | Bestgen | G06F 16/24526 |
| 2006/0074858 A1* | 4/2006 | Etzold | G06F 16/24535 |

(Continued)

FOREIGN PATENT DOCUMENTS

| | | |
|---|---|---|
| CN | 105022772 A | 11/2015 |
| CN | 105210058 A | 12/2015 |
| CN | 105765576 A | 7/2016 |

OTHER PUBLICATIONS

"Non Final Office Action Issued in U.S. Appl. No. 15/455,942", dated Nov. 1, 2021, 37 Pages.

(Continued)

*Primary Examiner* — Richard L Bowen
*Assistant Examiner* — Aryan D Toughiry

(57) ABSTRACT

Examples of the present disclosure describe systems and methods for query execution across multiple graphs. In an example, a graph or isolated collection may be split into multiple subparts, such that each subpart may store information of the isolated collection. Cross-collection reference resources may be used to reference resources that are stored by other isolated collection subparts. A breadth-first search of an isolated collection subpart may be performed in order to identify matches or potential matches in an isolated collection subpart. In an example, a potential match may comprise a cross-collection reference resource, which may reference a resource in another isolated collection subpart. Once query execution has completed in the isolated collection subpart, query execution may be paused and transferred to another isolated collection subpart that comprises a resource referenced by a cross-collection resource reference. Accordingly, query execution may resume in the subsequent isolated collection subpart.

20 Claims, 9 Drawing Sheets

(56) References Cited

U.S. PATENT DOCUMENTS

| | | |
|---|---|---|
| 2013/0159285 A1 | 6/2013 | Dees et al. |
| 2015/0095309 A1* | 4/2015 | Dees ................. G06F 16/24542 707/718 |
| 2015/0350324 A1* | 12/2015 | Hu ..................... H04L 67/1031 709/219 |
| 2016/0162496 A1* | 6/2016 | Gopalakrishnan .... G06F 16/116 707/756 |
| 2017/0364553 A1 | 12/2017 | Jacob et al. |
| 2017/0373935 A1* | 12/2017 | Subramanian ........ G06F 9/4856 |

OTHER PUBLICATIONS

"First Office Action and Search Report Issued in Chinese Patent Application No. 201880026369.6", dated Sep. 26, 2022, 23 Pages.

"Summons to Attend Oral Proceedings Issued in European Patent Application No. 18721211.3", Mailed Date : Mar. 17, 2022, 8 Pages.

"Final Office Action Issued in U.S. Appl. No. 15/455,942", dated Apr. 1, 2022, 40 Pages.

"Office action issued in China Patent application No. 201880026369.6", dated Apr. 21, 2023, 25 Pages.

* cited by examiner

QUERY EXECUTION ACROSS MULTIPLE GRAPHS

CROSS-REFERENCE TO RELATED APPLICATIONS

This application is a continuation application of U.S. patent application Ser. No. 15/493,761, filed Apr. 21, 2017, the entire disclosure of which is hereby incorporated herein by reference.

BACKGROUND

Graphs or isolated collections may be used to store a wide variety of information. Typically, such storage structures may be retained in operating memory in order to facilitate improved access, query, and storage times. However, as the amount of stored information increases, it may become difficult to retain all of the information in memory. This issue may be resolved by splitting the graph into multiple subgraphs across multiple computing devices.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for query execution across multiple graphs. In an example, a graph or isolated collection may be split into multiple subparts, such that each subpart may store information of the isolated collection. A cross-collection or cross-graph reference resource may be used in an isolated collection subpart to reference a resource stored by another isolated collection subpart. As a result, an isolated collection having multiple subparts may be traversed by following the cross-collection reference resources to access other subparts of the isolated collection.

When querying an isolated collection having multiple subparts, it may be difficult to efficiently access multiple subparts containing information associated with the query. Accordingly, aspects of the present disclosure relate to performing a breadth-first search in an isolated collection subpart in order to identify matches or potential matches. In an example, a potential match may comprise a cross-collection or cross-graph reference resource, which may reference a resource in another isolated collection subpart. Once query execution has completed in an isolated collection subpart, query execution may be paused and transferred to another isolated collection subpart that comprises a resource referenced by a cross-collection resource reference. Query execution may resume in the subsequent isolated collection subpart. Query execution may continually be transferred until query execution has completed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
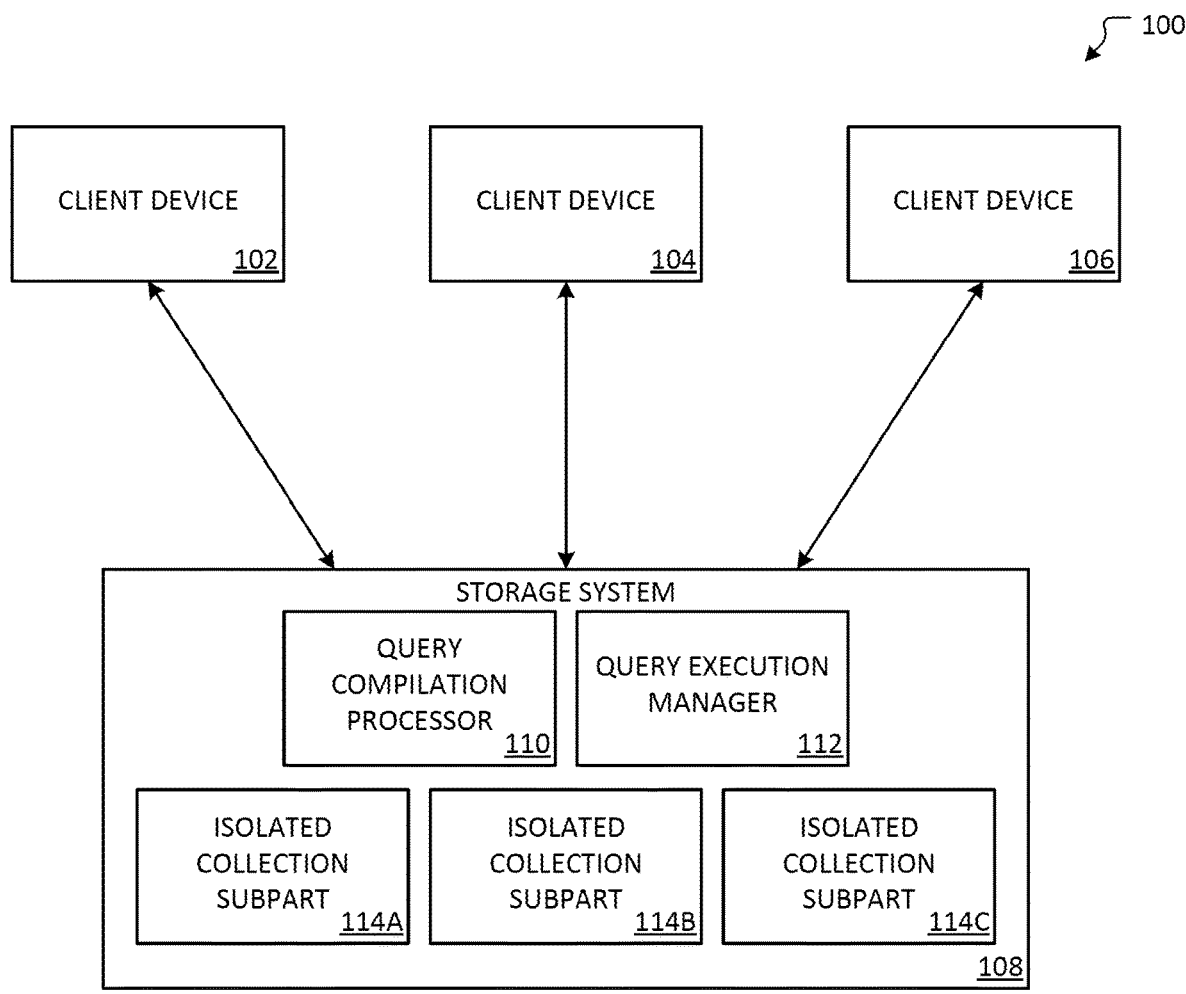
FIG. 1 illustrates an overview of an example system for query execution across multiple isolated collection subparts.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure provides systems and methods for query execution across multiple graphs. In an example, a graph or isolated collection may be provided or stored using multiple subparts, such that information of the isolated collection may be split across the subparts. Information stored by the isolated collection may be represented using one or more resources and relationships. In order to retrieve information from the isolated collection, a query comprising one or more parameters may be executed to identify target information relating to the one or more parameters within the isolated collection. Unlike relational databases, queries within an isolated collection rely on identifying relationships between resources and examining properties of resources and/or relationships within the isolated collection. Accordingly, a query within a graph may be executed by traversing the graph using one or more "anchor" resources. However, if an isolated collection is split into multiple subparts, not all relevant resources and relationships may be present in the isolated collection subpart in which the query was initially executed. As such, a query for target data stored by the isolated collection may be performed by accessing information in one or more subparts of the isolated collection in order to identify target data associated with the query.

In some examples, a graph or isolated collection may be comprised of resources and relationships. A resource may be identified by a resource identifier, which may be a durable Uniform Resource Identifier (URI) pointing to the particular resource. The resource identifier may also be a uniform resource locator (URL), uniform resource name (URN), or other suitable identifier or pointers pointing to the resource itself. In one example, the resource may be stored within an isolated collection. In another example, the resource may be stored in a data collection, while an associated resource identifier may be stored in an isolated collection. For example, the resource may reside on a remote server, and the resource identifier may be used to retrieve the resource (e.g., the resource may be stored on a remote web server, where the resource identifier comprises a URL). Identifying the location of a resource may include parsing the resource identifier using, for example, regular expressions, providing one or more portions of the resource identifier to a search utility, executing the resource identifier, etc. Relationships within the isolated collection may identify a correlation between two or more resources in the isolated collection. In some examples, an isolated collection may be a unified dimensional model (UDM), a graph, or other collection of resources and relationships.

A property may be associated with or stored by a resource or relationship of an isolated collection. In an example, the property may be comprised of a name and a value, such that the property may be used to store information relating to a resource or relationship. As an example, an "email" property (e.g., having the name "email") for a "person" resource may store an email address (e.g., as the value for the "email" property) for the person to which the "person" resource relates. In another example, a "relation" resource for a "family member" relationship may indicate that the "family member" relationship specifies a "brother" relationship for the relationship indicated by the "family member" relationship. As will be appreciated, a property may contain information other than a name and/or a value and may be stored as or associated with any type of information within a graph or an isolated collection.

An isolated collection may be queried to identify or retrieve target information (e.g., properties, resources, and/or relationships). The query may be comprised of one or more parameters or constraints relating to a relationship type, the type or content of a resource, or any other property of a relationship or a resource. In some examples, the parameters may relate to a plurality of resources (e.g., such as a friend-of-a-friend relationship or a resource that is common to a plurality of otherwise unrelated resources, etc.). The parameters of the query may relate to one or more "anchor" resources or resource types, which may be used when executing a query to identify a context or starting resource for query evaluation. As an example, an anchor resource may be a resource type or a plurality of resource types associated with a relationship, such that resources within the isolated collection matching the one or more resource types are identified and further evaluated based on the parameters of the query.

An isolated collection may be split into a plurality of subparts for any of a variety of reasons, including, but not limited to, due to computing resource constraints, to comply with security guidelines, or for ease of data management. In some examples, the isolated collection may be split such that similar types or domains of information may reside in similar subparts of the isolated collection. In other examples, the isolated collection may be split in order to minimize or reduce cross-collection querying. As an example, a subpart of an isolated collection may comprise information relating to a similar topic or information that is often accessed together, thereby increasing the likelihood that a query for information that is related to the topic may be executed without accessing information from another isolated collection subpart. It will be appreciated that an isolated collection may be split for any of a variety of reasons or may be split randomly, among other techniques. Further, content of isolated collection subparts need not be mutually exclusive, such that a resource or relationship may exist in a plurality of isolated collection subparts.

An isolated collection having multiple subparts may comprise one or more cross-collection or cross-graph reference resources, which may provide a reference to one or more resources in another isolated collection subpart. Accordingly, a cross-collection reference resource may indicate that additional information relating to a resource or relationship is available in another subpart of an isolated collection. The cross-collection reference resource may comprise a resource identifier of a resource to which it refers, a query that may be used to identify a resource, or an identifier associated with an isolated collection subpart that contains a referenced resource, among other descriptors. In some examples, the cross-collection reference resource may comprise additional information, such as cached information or one or more properties associated with a referenced resource, among other information.

A query for information in an isolated collection may be compiled or otherwise processed in order to generate a query that may be executed in the isolated collection. In some examples, compiling a query may comprise performing one or more optimizations (e.g., based on the order of parameters, the topology specified by the query, etc.). The resulting query may be a byte code program, a file (e.g., an XML or JSON file, etc.), or other distributable, such that the compiled query may be provided to any of a variety of computing devices or processors for execution or evaluation. In some examples, a virtual machine may be used to execute the query. While example query compilation and execution strategies are discussed herein, it will be appreciated that a query may be processed using other techniques without departing from the spirit of this disclosure.

When executing a query, an initial isolated collection subpart may be determined in which the query may be initially executed. The determination may be based on an analysis of one or more parameters of the query, such that it may be determined that an isolated collection subpart may have resources or relationships that are more related to the query than other isolated collection subparts. As an example, it may be determined that a query is related to people resources, so an isolated collection subpart having predominantly people resources may be a better initial isolated collection subpart than an isolated collection subpart having few people resources. The determination may be based on other information, such as the topology of a subpart (e.g., its structure, the number of relationships among resources, the number of resources of a given type, etc.) or the uniqueness or frequency of information within the subpart (e.g., the frequency of properties, resources, and/or relationships). The initial isolated collection subpart may be selected so as to minimize or reduce the amount of external information (e.g., stored by other isolated collection subparts, stored by other computing devices, etc.) that may be required when executing the query.

Executing the query may comprise generating, storing, or accessing execution context information, including, but not limited to, a traversal path data structure, a data storage structure, or a security context. In an example, the traversal path data structure may comprise information associated with resources and relationships that have been traversed while executing the query, such as resources and/or relationships that are positive matches, potential matches, and/or negative matches. Potential matches may be identified based on determining that information in the isolated collection subpart matches the query, but additional relevant information (e.g., as may be indicated by a cross-collection reference resource) is available in one or more other isolated collection subparts, thereby requiring further analysis based on information external to the isolated collection subpart.

A data storage structure may be used to store data from one or more isolated collection subparts that is relevant to the query execution. As an example, if a query parameter indicates that a match of the query comprises a resource having a property with a certain value, property values for matching or potentially matching resources in an isolated collection subpart may be stored in the data storage structure, such that they may be evaluated based on information in subsequent isolated collection subparts. Similarly, if a query indicates that results should be filtered after matches are identified, information relevant to filtering the matches may be stored by the data storage structure. As a result, information from one or more isolated collection subparts relating to query execution may be stored for later evaluation, such that at least a part of the information need not be later accessed from isolated collection subparts that have already be evaluated as part of the query execution. In some examples, a query execution occurring in a single isolated collection subpart may be performed without a data storage structure, as the relevant information for executing the query may already be available based on the content of the isolated collection subpart in which the query is executing.

A security context may be used to limit access to resources or relationships in the isolated collection that may be access-restricted from the requestor. The security context may comprise credentials, security claims, access rules, or one or more groups associated with the requestor, among other security information. As a result, the security context may be evaluated when executing the query in one or more isolated collection subparts, thereby ensuring that the target data returned to the requestor conforms to the access restrictions specified by the security context.

While examples of execution context information are discussed herein, it will be appreciated that additional or alternative execution context information may be generated, stored, or accessed when executing a query. In an example, execution context information may comprise any of a variety of information that may be useful when executing the query. In some examples, the execution context information may serve as a cache, thereby reducing the need to issue separate or additional access requests for information that may have already been accessed, requested, or available while executing a query. In other examples, execution context information may be pruned or otherwise managed while executing a query, such that information that is no longer needed or relevant may be removed or omitted. As an example, a data storage structure may be pruned to remove information associated with resources or relationships that were previously potential matches but have since been eliminated. Similarly, a traversal path data structure may be pruned to omit potential matches that have been eliminated. As a result, the execution context information may be managed so as to minimize or reduce the amount of information that is passed between isolated collection subparts.

After executing a query in an initial isolated collection subpart, it may be determined that query execution should continue in one or more subsequent isolated collection subparts. The determination may be based on identifying one or more cross-collection reference resources in the set of matches or potential matches. Accordingly, query execution may be paused and the query (e.g., the compiled query and at least part of the execution context information, etc.) may be transmitted for execution in a subsequent isolated collection subpart. The subsequent isolated collection subpart may be identified using a similar technique as was used to identify the initial isolated collection subpart, wherein the subsequent isolated collection subpart may be determined to contain or may be determined to be likely to contain information associated with the query. In an example, this may comprise evaluating one or more of the cross-collection reference resources. Query execution may then be resumed in the subsequent isolated collection subpart.

Eventually, the query execution may complete. This may comprise determining that no further cross-collection reference resources have been identified or that there are no additional resources and relationships to evaluate that are relevant to the query, among other conditions. As a result, the execution context information may be used to generate a response comprising the target data. In an example, a traversal path data structure comprising resources and/or relationships that were identified as a match or a potential match for the query may be evaluated. The evaluation may comprise evaluating information stored in a data storage structure of the execution context information, such that information associated with the relevant resources and/or relationships of the traversal path data structure may be used to generate and return the identified target data.

FIG. 1 illustrates an overview of an example system 100 for query execution across multiple isolated collection subparts. System 100 comprises client devices 102-106, which communicate with storage system 108. In an example, each of client devices 102-106 may be a computing device, such as a mobile computing device, a table computing device, a personal computing device, or any other type of computing device, or any combination thereof. Client devices 102-106 may communicate with storage system 108 by way of a network, including, but not limited to, a local area network, a wide area network, or the Internet. Storage system 108 may be provided by one or more computing devices and, in some examples, may be a distributed storage system.

Storage system 108 comprises query compilation processor 110 and query execution manager 112. Query compilation processor 110 may receive queries for information stored by storage system 108 and compile the received queries. In some examples, compiling a query may comprise performing one or more optimizations according to aspects disclosed herein. As discussed above, a query may be compiled into a byte code program, a file, or other distributable, such that the compiled query may be provided to any of a variety of computing devices or processors for execution or evaluation. In an example, a virtual machine may be used to execute a compiled query. Query execution manager 112 may manage the execution of a compiled query, as may have been generated by query compilation processor 110. Query execution manager 112 may manage the execution of a query across an isolated collection comprising isolated collection subparts 114A-C.

In some examples, isolated collection subparts 114A-C may be stored or provided by multiple computing devices. While discrete elements are discussed herein with respect to FIG. 1, it will be appreciated that functions described with respect to a specific element of system 100 may be performed by other elements. As an example, one or more of isolated collection subparts 114A-C may comprise a query execution manager and/or a query compilation processor, rather than being directed by a single query execution manager 112 as illustrated in FIG. 1. Additionally, while three isolated collection subparts are shown in FIG. 1, it will be appreciated that aspects disclosed herein may be practiced with an isolated collection having any number of subparts.

Query compilation processor 110 may receive a query from one of client devices 102-106. In some examples, the query may be formulated using a query language (e.g., Cypher Query Language, SPARQL, etc.) to access information stored by isolated collection subparts 114A-C. Query compilation processor 110 may compile the query according to aspects disclosed herein and provide the query to query execution manager 112. Query execution manager 112 may evaluate the query to identify whether one of isolated collection subparts 114A-C would be a suitable initial isolated collection subpart in which to begin query execution. The evaluation may comprise evaluating information associated with one or more parameters of the query (e.g., resource types, relationship types, property types, topology information, uniqueness information, etc.). In some examples, multiple isolated collection subparts 114A-C may be candidates for beginning query execution. As a result, query execution manager 112 may identify an initial isolated collection subpart based on utilization information, proximity information (e.g., which isolated collection subpart is closest to the requestor and may therefore exhibit less latency, etc.), among other considerations. In some examples, query execution manager 112 may apply other logic or may randomly select an isolated collection subpart in which to begin execution.

Assuming, for the purpose of illustration, that query execution begins in isolated collection subpart 114A, query execution may begin from one or more anchor resources within the subpart. Accordingly, resources and relationships associated with an anchor resource may be evaluated based on parameters of the query, such that a positive match or potential match may be identified. In some examples, a negative match may also be determined. Execution context information may be updated, such that a traversal path data structure may include positive matches, potential matches, and/or negative matches. In an example, isolated collection subpart 114A may comprise the relevant resources and relationships for query execution, thereby enabling query execution to complete in isolated collection subpart 114A. As a result, target data comprising resources and/or relationships matching the query may be provided to query execution manager 112, which query execution manager 112 may then provide in response to the requestor.

In another example, resources and relationships that are relevant to the query may exist outside of isolated collection 114A, and may be stored by isolated collection 114B and/or 114C. As a result, one or more cross-collection reference resources may be identified during the execution of the query in isolated collection 114A. Execution context information may be updated accordingly, such that a traversal path data structure may indicate a potential match comprising a path between an anchor resource and a cross-collection reference resource. As discussed above, a cross-collection reference resource may be a reference to one or more resources stored in another isolated collection subpart. In some examples, a data storage structure of the execution context information may be updated to store information associated with one or more resources or relationships in isolated collection subpart 114A for later reference. Executing the query in isolated collection 114A may comprise performing a breadth-first search, wherein matches and potential matches are identified in isolated collection subpart 114A, including any relevant cross-collection reference resources, before continuing the query in a subsequent isolated collection subpart.

Once query execution completes (e.g., progresses until no more relevant resources and relationships may remain for evaluation), query execution may be paused and transferred, such that the query and the execution context information may be executed in a subsequent isolated collection subpart. As illustrated, query execution manager 112 may pause the query execution, transfer the query to a subsequent isolated collection subpart, and use the execution context information to resume execution of the query in the subsequent isolated collection subpart. In another example, isolated collection subpart 114A may manage execution of the query and may provide the query and execution context information to a subsequent isolated collection subpart for continued execution. In some examples, identifying the subsequent isolated collection subpart may comprise evaluating a traversal path data structure in order to identify one or more cross-collection resource references, which may be used to identify one or more isolated collection subparts containing resources to which they refer. Query execution may then be continued in the subsequent isolated collection subpart (e.g., isolated collection subpart 114B or 114C) according to aspects disclosed herein. Execution may then either complete (e.g., if cross-collection reference resources are not identified when continuing the query execution, if no resources remain, etc.) or may again progress to another isolated collection subpart.

Figure 2B:
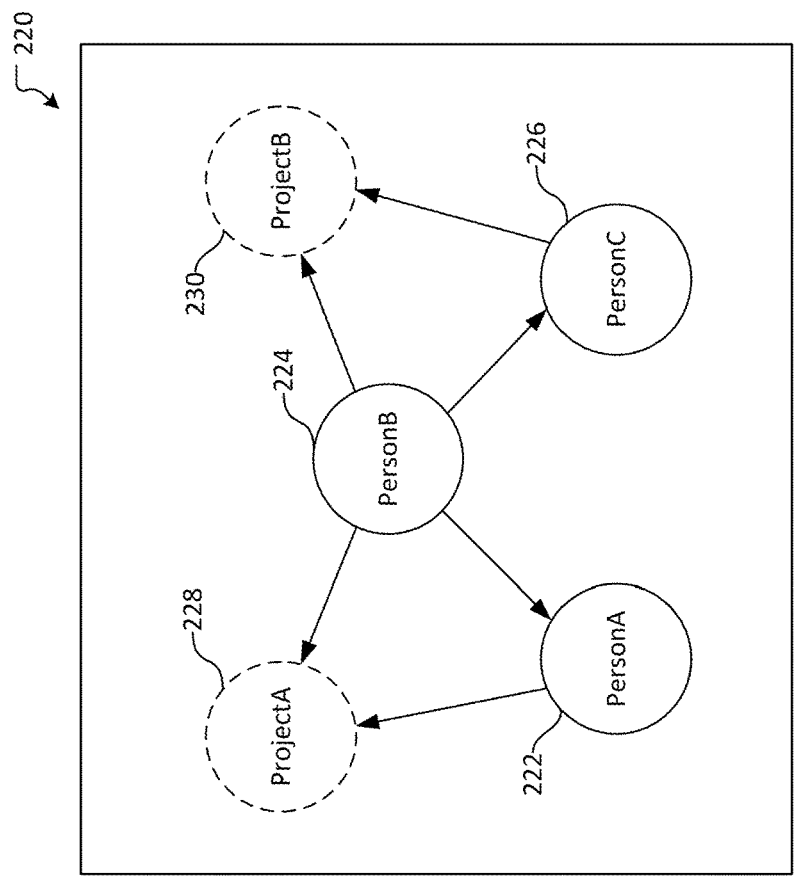
FIGS. 2A and 2B illustrate overviews of example isolated collection subparts of an isolated collection across which queries may be executed.
Figure 2A:
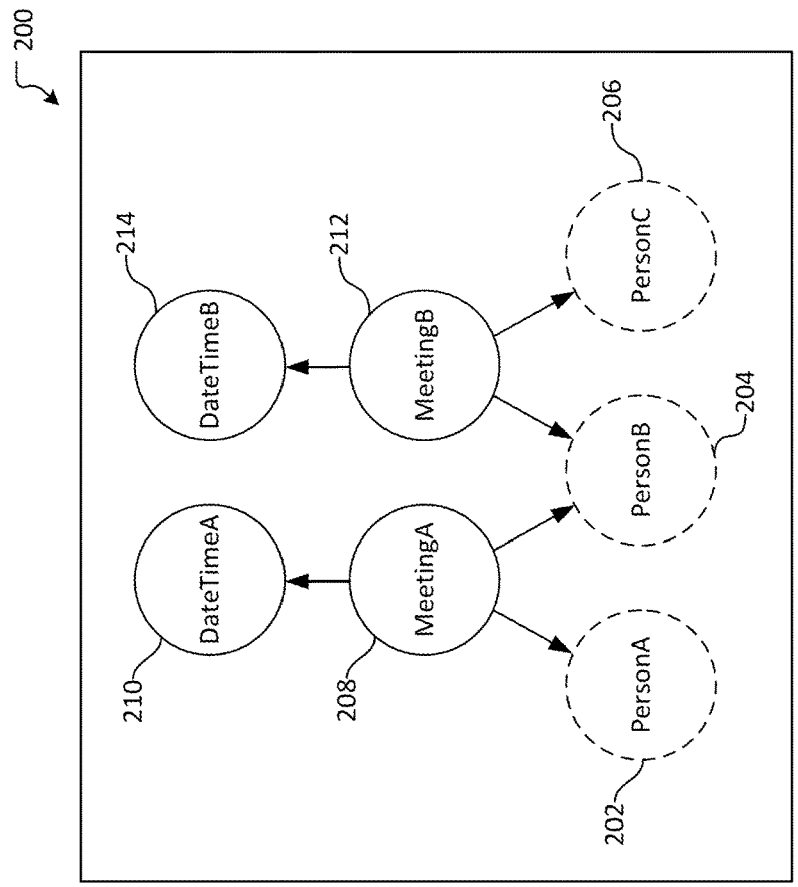

FIGS. 2A and 2B illustrate overviews of example isolated collection subparts 200 and 220 of an isolated collection across which queries may be executed. As illustrated, isolated collection subpart 200 comprises resources and relationships associated with calendaring information, while isolated collection subpart 220 comprises resources and relationships associated with people in an organizational structure. While example domains are discussed with respect to isolated collection subparts 200 and 220, it will be appreciated that an isolated collection may be split based on any of a variety of criteria, associations, or logic according to aspects disclosed herein.

With respect to isolated collection subpart 200 in FIG. 2A, MeetingA 208 and MeetingB 212 are shown, wherein MeetingA 208 occurs at DateTimeA 210, while MeetingB 212 occurs at DateTimeB 214. Resources 208-214 are illustrated using solid lines, indicating that information associated with resources 208-214 (e.g., properties, metadata, etc.) is stored in isolated collection subpart 200. PersonA 202 and PersonB 204 are illustrated as being related to MeetingA 208, thereby indicating that they are attendees of MeetingA 208. Similarly, PersonB 204 and PersonC 206 are illustrated as being related to MeetingB 212, thereby indicating that they are attendees of MeetingB 212. Person resources 202-206 are illustrated using dashed lines to indicate that they are cross-collection reference resources, such that additional information associated with person resources 202-206 may be stored by another isolated collection subpart (e.g., isolated collection subpart 220 in FIG. 2B).

As discussed above, as cross-collection reference resources, person resources 202-206 may comprise information that may be used to identify one or more resources to which the resources refer, including, but not limited to, a resource identifier of a resource to which it refers, a query that may be used to identify a resource, or an identifier associated with an isolated collection subpart that contains a referenced resource, among other descriptors. In some examples, a cross-collection reference resource may comprise additional information, such as cached information or one or more properties associated with a referenced resource, among other information.

Turning now to isolated collection subpart 220 in FIG. 2B, isolated collection subpart 220 comprises person resources 222-226, which may be part of an organizational hierarchy. As illustrated, PersonA 222 and PersonC 226 are managed by PersonB 224. Further, PersonA 222 and PersonB 224 are associated with ProjectA 228, while PersonB 224 and PersonC 226 are associated with ProjectB 230. Person resources 222-226 are illustrated using solid lines, indicating that isolated collection subpart 220 may store information associated with person resources 222-226, such as properties or metadata, among other information. Project resources 228-230, however, are illustrated using dashed lines, thereby indicating that they are cross-collection reference resources referring to project resources in another isolated collection subpart (not pictured).

In an example, isolated collection subparts 200 and 220 may be queried according to aspects disclosed herein. A query may indicate that a match is comprised of a meeting resource having an identifier of "MeetingA" that is associated with a datetime resource, in order to determine when MeetingA is occurring. The query may be compiled according to aspects disclosed herein, such that it may be executed in one or more of isolated collection subparts 200 and 220. It may be determined that the query should be executed in isolated collection 200, as a result of determining that isolated collection subpart 200 comprises meeting resources, while isolated collection subpart 220 does not. Accordingly, the query may use MeetingA 208 as an anchor resource and evaluate its associated resources and relationships. Upon identifying DateTimeA 210 as an associated resource satisfying the query, query execution may complete, such that information associated with DateTimeA 210 may be returned in response to the query.

In another example, a query may be provided in order to determine the manger associated with MeetingB 212. As such, the query may indicate that a match is comprised of a meeting resource having an identifier of "MeetingB," that is associated a person resource (e.g., the manager), wherein the person resource is further associated with another person resource (e.g., the subordinate) that was also an attendee of MeetingB. Isolated collection subpart 200 may again be selected as the initial isolated collection subpart for query execution, given that the anchor resource is a meeting resource and isolated collection subpart 220 does not have any meeting resources. Query execution may begin at MeetingB 212, where associated resources and relationships may be identified. PersonB 204 and PersonC 206 may be identified as potential matches, as a result of being person resources associated with MeetingB 212. However, due to identifying cross-collection reference resources, query execution may be paused in order to transfer execution to another isolated collection subpart. Execution context information may be transferred as well, according to aspects disclosed herein. In an example, the execution context information may comprise a traversal path data structure, indicating the potential matches comprising the paths between MeetingB 212 and PersonB 204, and MeetingB 212 and PersonC 206. In another example, the execution context information may comprise a data storage structure having information associated with the resources and relationships of the traversal path data structure. As an example, the data storage structure may indicate that both PersonB 204 and PersonC 206 are attendees of MeetingB 212, such that the information may later be referenced in order to determine whether a subordinate person identified as being related to a manager person was also an attendee of MeetingB.

The query may be transferred to isolated collection subpart 220, based on information contained in the cross-collection reference resources. In an example, PersonB 204 may indicate it refers to a person resource having an identifier of "PersonB" in isolated collection subpart 220, while PersonC 206 may indicate it refers to a person resource having an identifier of "PersonC" in isolated collection subpart 220. As a result, query execution may resume in isolated collection 220, wherein the anchor resources for the resumed query execution are the resources referenced by PersonB 204 and PersonC 206: PersonB 224 and PersonC 226, respectively. When query execution resumes in isolated collection subpart 220, each of PersonB 224 and PersonC 226 may be evaluated to determine whether any resources and relationships satisfy the query. Resuming at PersonC 226, it may be determined that PersonC 226 is not related to any subsequent person resources (as the arrow between PersonB 224 and PersonC 226 is directional, indicating that PersonB 224 manages PersonC 226, rather than the other way around). Accordingly, PersonC 226 cannot be a manager and the potential match comprising the path from MeetingB 212 to PersonC 206 may be removed from the traversal path data structure in the execution context information. However, given that PersonC 206 was an attendee of MeetingB 212, information associated with PersonC 206 may remain in the data storage structure of the execution context information (e.g., indicating that PersonC 206 was an attendee of MeetingB 212).

When the query is evaluated using PersonB 224 as the anchor resource, it may be determined that PersonB 224 is associated with two people: PersonA 222 and PersonC 226. With respect to PersonA 222, it may be determined, based on the data storage structure of the execution context information, that PersonA 222 was not an attendee of MeetingB 212. This determination may be made without further reference to isolated collection subpart 200, as a result of the information stored by the data storage structure. When query execution moves to evaluate PersonC 226, it may be determined that PersonC 226 was an attendee of MeetingB 212, because PersonC 206 in isolated collection 200 (which is related to MeetingB 212 in isolated collection subpart 200) refers to PersonC 226. Accordingly, query execution may complete, such that target data may be provided comprising the resources and relationships associated with the traversal path between MeetingB 212, PersonB 224 (via PersonB 204), and PersonC 226.

Figure 3:
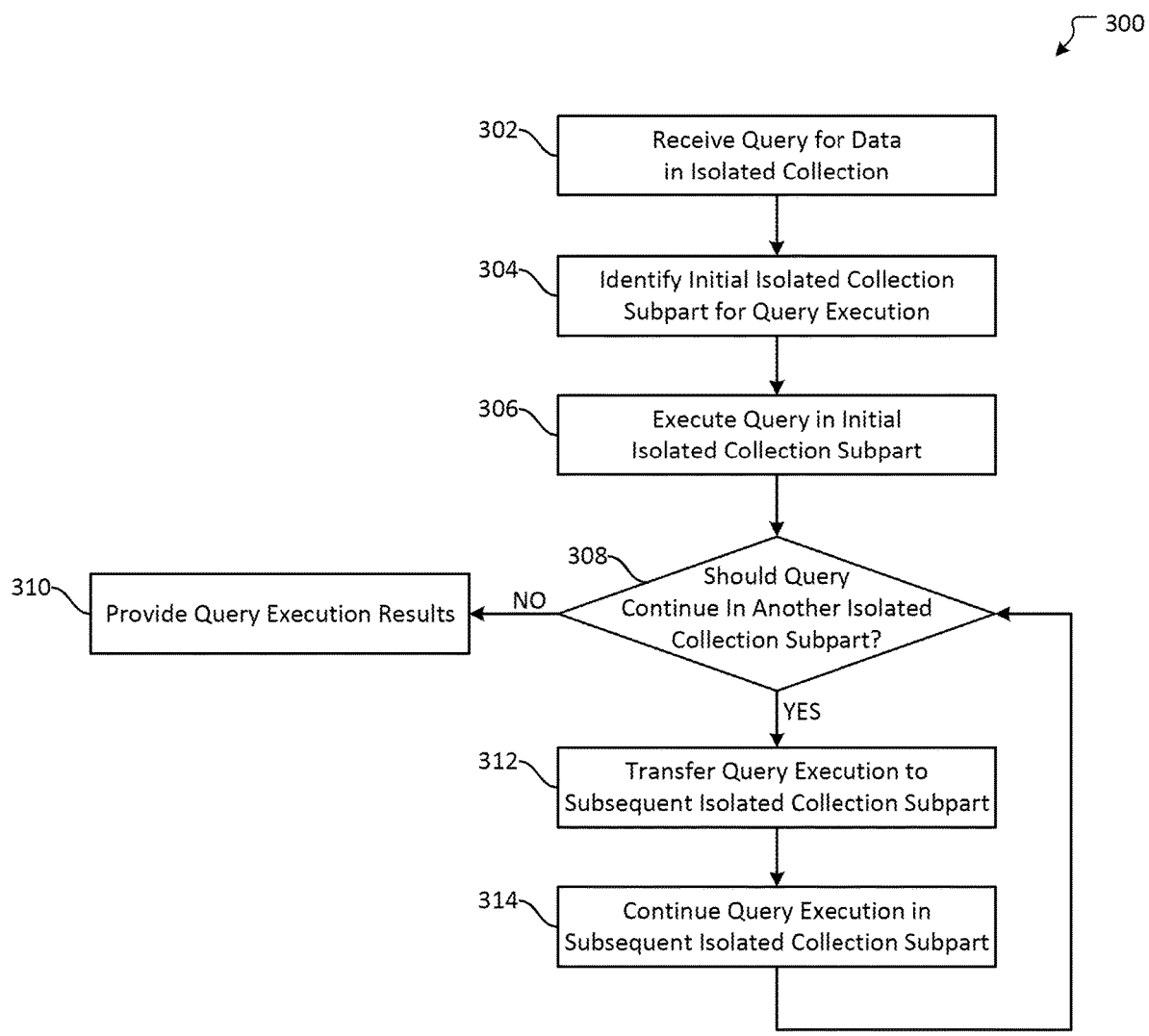
FIG. 3 illustrates an overview of an example method for query execution across multiple isolated collection subparts.

FIG. 3 illustrates an overview of an example method 300 for query execution across multiple isolated collection subparts. Method 300 may be performed by a storage system, such as storage system 108 in FIG. 1. In an example, method 300 may be performed by a computer device or a query execution manager, among other devices or processors. Method 300 begins at operation 302, where a query for data in an isolated collection may be received. The query may be received from a client, such as one of clients 102-106 in FIG. 1. In some examples, the query may be formulated using a query language. As described above, the query may be comprised of one or more parameters, which may be used to identify target data stored by the isolated collection. In an example, the isolated collection may be comprised of a plurality of isolated collection subparts according to aspects disclosed herein.

At operation 304, an initial isolated collection subpart may be identified for query execution. Identifying the initial isolated collection subpart may comprise evaluating one or more parameters of the query and information relating to the plurality of isolated collection subparts. As an example, the query may be determined to relate to one or more resource types. As a result, the initial isolated collection subpart may be selected based on the presence and/or frequency with which the resource type occurs in the isolated collection subpart. In another example, uniqueness or topology information may be evaluated, such that an isolated collection having more unique resources (e.g., as compared to the resources of other isolated collection subparts) relating to the query may be selected as the initial isolated collection subpart. It will be appreciated that other techniques may be used to select the initial isolated collection subpart without departing from the spirit of this disclosure.

Moving to operation 306, the query may be executed in the initial isolated collection subpart. In some examples, query execution may comprise performing one or more steps of method 400 as discussed below with respect to FIG. 4. Executing the query may comprise evaluating resources and relationships associated with one or more anchor nodes in order to identify matching or potentially matching traversal paths, according to aspects disclosed herein. In an example, the query may be compiled or otherwise processed according to aspects disclosed herein. As described above, the query execution may comprise a breadth-first search, wherein matches and potential matches are identified within the initial isolated collection subpart before, if necessary, continuing the execution in another isolated collection subpart. In some examples, the execution may comprise generating or updating execution context information, which may comprise a traversal path data structure and/or a data storage structure. The traversal path data structure may comprise information associated with positive matches, potential matches, and/or negative matches that have been identified during query execution. The data storage structure may be used to store information associated with one or more evaluated resources and/or relationships that may be evaluated later based on information stored by other isolated collection subparts. As a result, additional information may not be required from isolated collection subparts that have already been queried.

Eventually, query execution may reach a point at which further resources and relationships relating to the query are not available in the isolated collection subpart. Accordingly, flow progresses to determination 308, where it may be determined whether query execution should continue in another isolated collection subpart. The determination may comprise an evaluation of the traversal path data structure. In some examples, the determination may comprise evaluating whether any cross-collection reference resources are present in the traversal path data structure. In other examples, the determination may comprise determining whether there are any potential matches in the traversal path (e.g., as opposed to just positive or negative matches). As an example, a potential match may indicate that additional information may be needed to complete the evaluation of the match and determine whether the traversal path satisfies the query.

If it is determined that the query should not continue, flow branches "NO" to operation 310, where query execution results may be provided. Providing the query execution results may comprise generating an isolated collection comprising resources and relationships associated with the matching information or providing resource identifiers associated with the matching information, among other representations. In an example, the execution context information may be used to filter or otherwise revise the results prior to providing them. Information from a data storage structure may be used to evaluate matches that were identified in order to evaluate properties or other information associated with the identified matches. Flow terminates at operation 310.

If, however, it is determined that query execution should continue in another isolated collection subpart, flow branches "YES" to operation 312, where query execution may be transferred to a subsequent isolated collection subpart. The subsequent isolated collection subpart may be identified according to aspects disclosed herein. As an example, the subsequent isolated collection subpart may be selected based on determining which isolated collection subpart is most referenced by one or more cross-collection reference resources that were identified when performing the initial query execution. It will be appreciated that other subpart selection techniques may be used. Transferring the query may comprise transferring a distributable that was generated when compiling the query (e.g., byte code, a JSON file, etc.) and/or at least a part of an execution context associated with the query execution.

Moving to operation 314, query execution may continue in the subsequent isolated collection subpart. Query execution may continue in a similar manner as was described above with respect to operation 306, however the query may resume at one or more resources that were referenced by one or more cross-collection reference resources from the initial isolated collection subpart. In some examples, execution context information may be updated while executing the query, such that potential matches that are eliminated may be pruned or revised from a traversal path data structure and/or a data storage structure.

Flow then returns to determination 308, where it may again be determined whether query execution should continue in another isolated collection subpart. Flow may loop between operations 308, 312, and 314 while there are other isolated collection subparts having information associated with the query (e.g., as may be determined by one or more cross-collection reference resources). Eventually, it may be determined that query execution has completed and should not continue in another isolated collection subpart, causing flow to progress to operation 310, where query execution results may be provided as discussed above. Flow terminates at operation 310.

Figure 4:
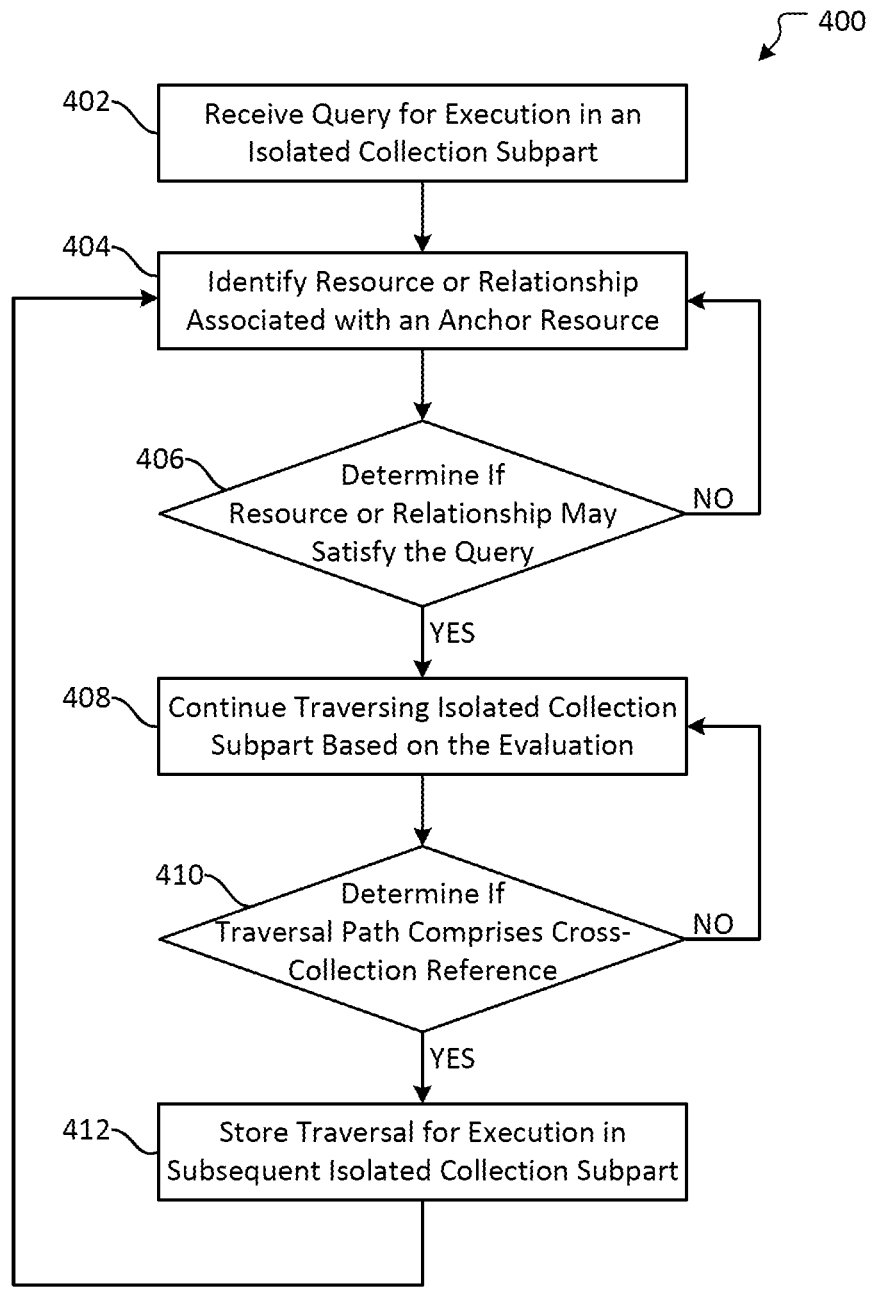
FIG. 4 illustrates an overview of an example method for executing a cross-collection query in an isolated collection subpart.

FIG. 4 illustrates an overview of an example method 400 for executing a cross-collection query in an isolated collection subpart. In some examples, query execution may comprise performing one or more steps of method 400 as discussed below with respect to FIG. 4. Method 400 may be performed by a storage system, such as storage system 108 in FIG. 1. In an example, method 400 may be performed by a computer device or a query execution manager, among other devices or processors. Method 400 begins at operation 402, where a query for execution in an isolated collection subpart may be received. In an example, the query may comprise one or more parameters and/or may indicate an anchor resource. The query may be a compiled or otherwise distributable query as described herein. In some examples, the query may be received along with execution context information. In some examples, the query may be received from a query execution manager, a client, or from within a storage system (e.g., a computing device storing another subpart of the isolated collection).

At operation 404, a resource or relationship may be identified that is associated with an anchor resource of the query. The anchor resource may be identified based on a unique identifier or one or more properties or relationships, among other techniques. Moving to determination 406, it may be determined whether the resource or relationship satisfies one or more parameters of the query. The determination may comprise evaluating one or more properties of the resource or relationship, evaluating metadata, or evaluating other information associated with the resource or relationship. If it is determined that the resource or relationship does not satisfy the query, flow branches "NO" to operation 404, where another resource or relationship may be identified. Flow may then loop between operations 404 and 406 until a resource or relationship that satisfies the query is identified.

If, however, it is determined at determination 406 that the resource or relationship satisfies the query, flow branches "YES" to operation 408, where the isolated collection subpart may be traversed based on the evaluation. Continuing the traversal may comprise continuing to evaluate resources and relationships associated with the identified resource or relationship to determine whether any subsequent resources or relationships satisfy the query. If a subsequent resource or relationship satisfies the query, the traversal path may be extended accordingly. At determination 410, it may be determined whether a cross-collection reference resource is part of the traversal path. If it is determined that a cross-collection reference resource is not part of the traversal path, flow branches "NO" to operation 408, where the traversal may continue, again identifying resources or relationships that satisfy the query to extend the traversal path.

If, however, it is determined that a cross-collection reference resource is part of the traversal path, flow branches "YES" to operation 412, where the traversal path may be stored as part of execution context information, which may later be referenced when continuing the query execution in another isolated collection subpart. As a result of identifying a cross-collection reference resource as part of the traversal path, the traversal path may end with the cross-collection reference resource, such that the traversal may continue to identify other potential or positive matches within the isolated collection subpart, thereby returning to operation 404. Flow may continue between operations 404-412 until it has been determined that there are no further relevant resources for evaluation in the isolated collection subpart. In some examples, query execution may then be paused, the query and the execution context information may be transferred to another isolated collection subpart, and execution may resume in the other isolated collection subpart according to aspects disclosed herein.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
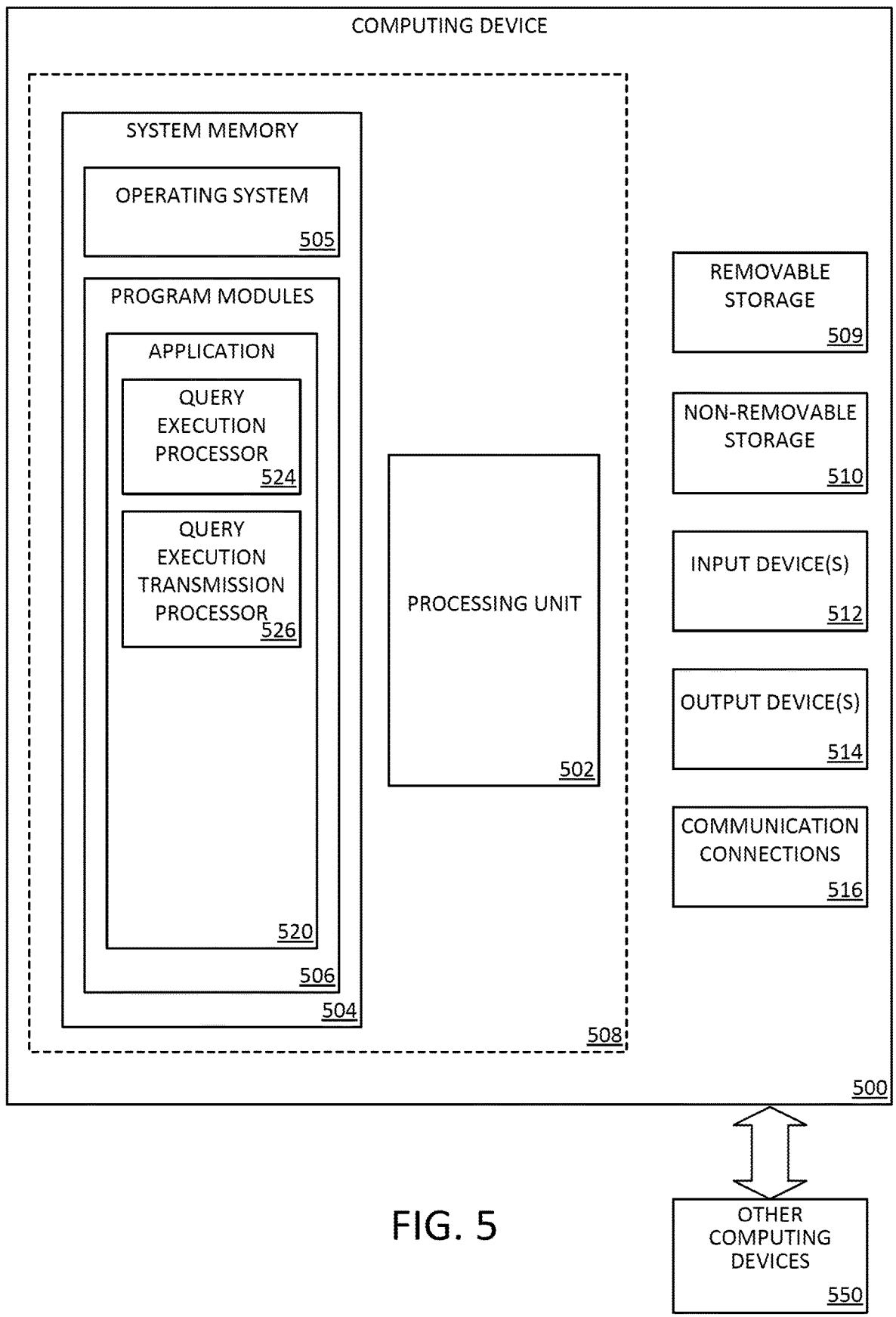
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. The computing device components described below may be suitable for the computing devices described above. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for performing the various aspects disclosed herein such as query execution processor 524 and query execution transmission processor 526. The operating system 505, for example, may be suitable for controlling the operation of the computing device 500. Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., application 520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
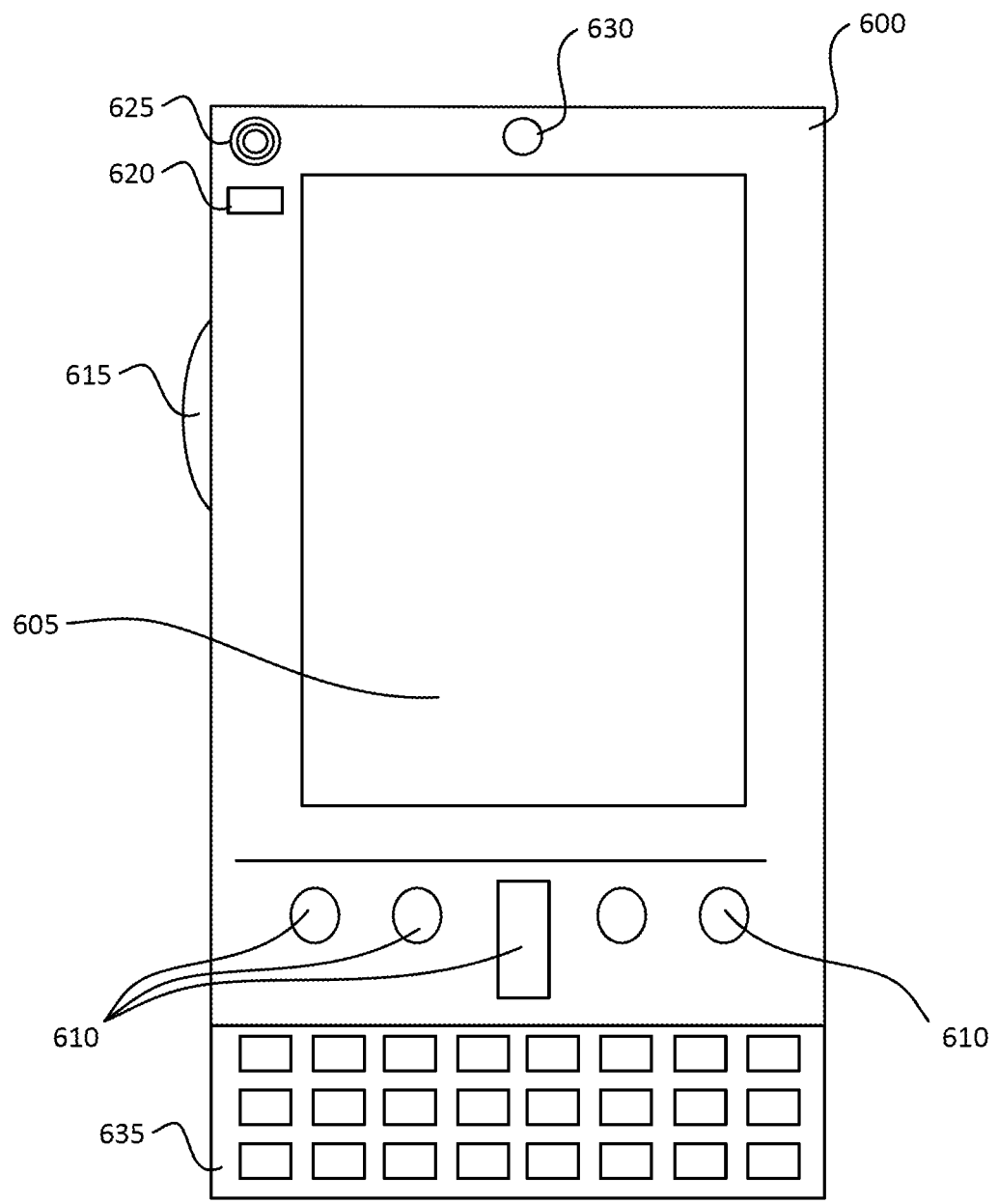
FIGS. 6A and 6B are simplified block diagrams of a mobile computing device with which aspects of the present disclosure may be practiced.
Figure 6B:
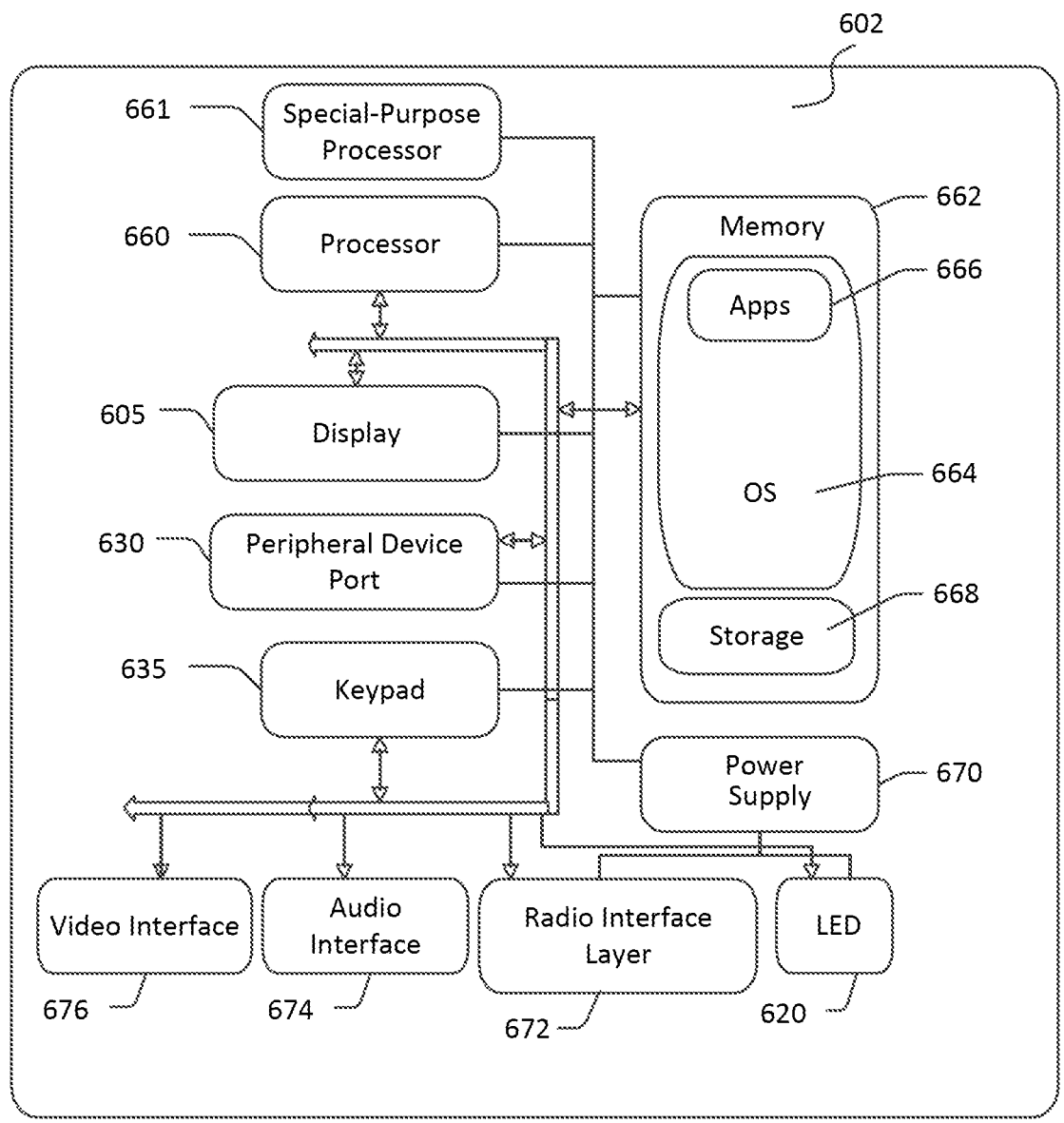

FIGS. 6A and 6B illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein (e.g., search engine, extractor module, relevancy ranking module, answer scoring module, etc.).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Figure 7:
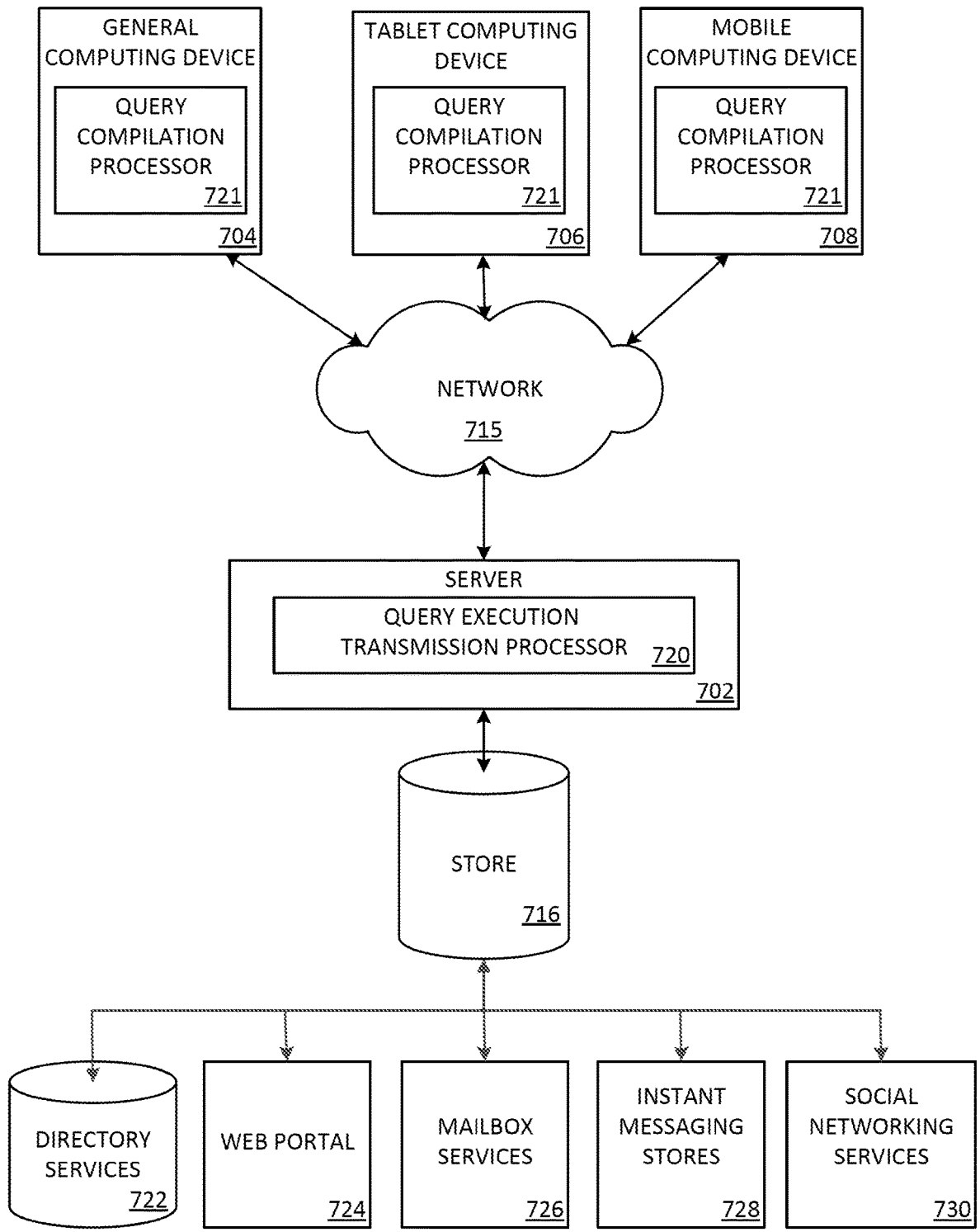
FIG. 7 is a simplified block diagram of a distributed computing system in which aspects of the present disclosure may be practiced.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking site 730. Query compilation processor 721 may be employed by a client that communicates with server device 702, and/or query execution transmission processor 720 may be employed by server device 702. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these embodiments of the computing devices may obtain content from the store 716, in addition to receiving graphical data useable to be either pre-processed at a graphic-originating system, or post-processed at a receiving computing system.

Figure 8:
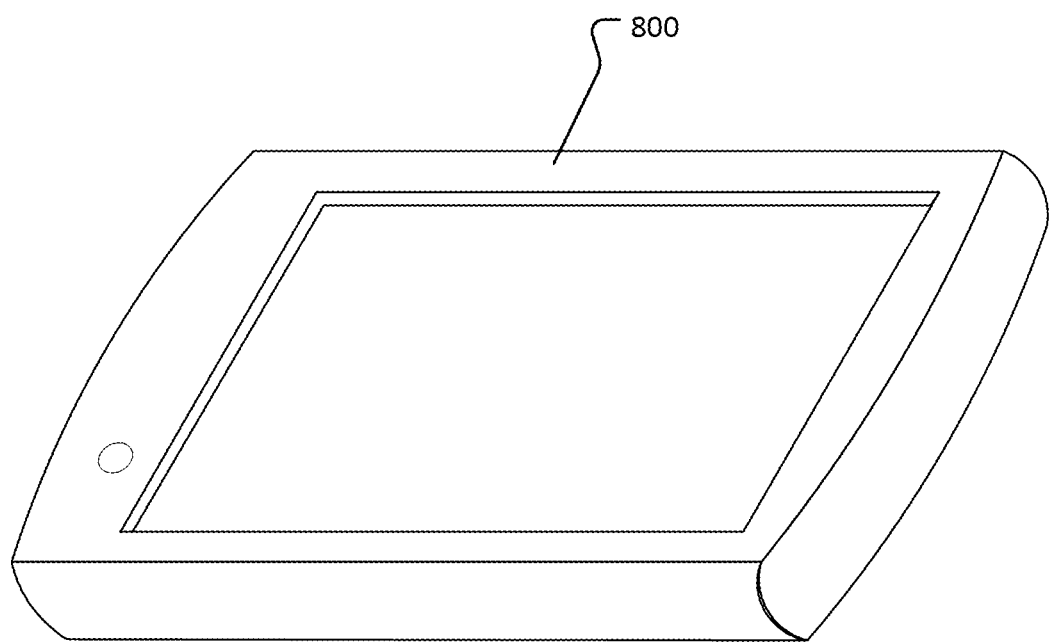
FIG. 8 illustrates a tablet computing device for executing one or more aspects of the present disclosure.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and a memory storing instructions that when executed by the at least one processor perform a set of operations. The operations comprise: receiving a query for information stored in a graph, wherein the graph comprises a plurality of graph subparts; executing the query in a graph subpart of the plurality of graph subparts to generate an intermediate result and identify one or more cross-graph reference resources associated with one or more other graph subparts of the graph; generating, based on the one or more cross-graph reference resources, a query execution context associated with the query for information comprising at least a part of the intermediate result and at least a part of the query; and providing, to at least one of the one or more other graph subparts of the graph, the query execution context for continued execution of the query for information in the at least one of the one or more other graph subparts. In an example, executing the query in the subpart of the plurality of subparts comprises: identifying, based on the query for information, the graph subpart from the plurality of graph subparts based on determining a parameter of the query for information is present in the graph subpart. In another example, generating the query execution context and providing the query execution context is performed based on a determination that the intermediate result comprises the one or more cross-graph reference resources. In a further example, the intermediate result comprises one or more partial matches for the query, wherein a partial match comprises information identified in the graph subpart and stored in at least one of the one or more other graph subparts. In yet another example, the set of operations further comprises: generating a compiled query for the received query, wherein the compiled query is executable in a virtual machine. In a further still example, the query execution context comprises a security context indicating access control information for information in the graph. In another example, the intermediate result comprises the one or more cross-graph reference resources.

In another aspect, the technology relates to a computer-implemented method for executing a query for information in a graph subpart of a graph. The method comprises: receiving the query for information in the graph subpart; traversing the graph subpart to generate a traversal path associated with the query for information, wherein the traversal path is comprised of one or more resources and one or more relationships; determining whether a resource of the traversal path is a cross-graph reference resource associated with a subsequent graph subpart of the graph; based on determining that the resource of the traversal path is a cross-graph reference resource, storing the traversal path in a traversal path data structure for transmission to the subsequent graph subpart; and based on determining that the resource of the traversal path is not a cross-graph reference resource, providing the traversal path as a result to the query for information. In an example, query for information comprises execution context information, and wherein traversing the graph subpart comprises evaluating the graph subpart from one or more resources identified in the execution context information. In another example, the execution context information comprises the traversal path data structure. In a further example, the query for information is received from another graph subpart. In yet another example, the method further comprises generating a compiled query for the received query, wherein the compiled query is executable in a virtual machine. In a further still example, the execution context comprises a security context indicating access control information for information in the graph.

In a further aspect, the technology relates to another computer-implemented method for executing a query for information across a plurality of graph subparts of a graph. The method comprises: receiving the query for information stored in the graph; identifying a graph subpart from the plurality of graph subparts; traversing the graph subpart to generate a traversal path associated with the query for information, wherein the traversal path is comprised of one or more resources and one or more relationships; determining whether a resource of the traversal path is a cross-graph reference resource associated with a subsequent graph subpart of the graph; based on determining that the resource of the traversal path is a cross-graph reference resource, generating a query execution context associated with the query for information comprising at least a part of the traversal path and at least a part of the query; and providing, to the subsequent graph subpart, the query execution context for continued execution of the query for information in the subsequent graph subpart. In an example, the query for information comprises execution context information, and wherein traversing the graph subpart comprises evaluating the graph subpart from one or more resources identified in the execution context information. In another example, the method further comprises: based on determining that the resource of the traversal path is not a cross-graph reference resource, providing the traversal path as a result to the query for information. In a further example, identifying the graph subpart comprises identifying the graph subpart based on determining a parameter of the query for information is present in the graph subpart from the plurality of graph subparts. In yet another example, the method further comprises generating a compiled query for the received query, wherein the compiled query is executable in a virtual machine. In a further still example, the query execution context comprises a security context indicating access control information for information in the graph. In another example, the query for information is received from another graph subpart of the graph.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   a memory storing instructions that when executed by the at least one processor perform a set of operations comprising:
   receiving a first query for information stored in a graph, wherein the graph comprises a plurality of graph subparts;
   executing the first query in a graph subpart of the plurality of graph subparts to identify one or more cross-graph reference resources associated with one or more other graph subparts of the graph, the one or more cross-graph reference resources comprising at least one of:
   a second query used to identify a resource in the one or more other graph subparts of the graph;
   a subpart identifier used to identify the one or more other graph subparts of the graph; or
   a property identifier used to identify one or more properties associated with the resource in the one or more other graph subparts of the graph;
   generating, based on the one or more cross-graph reference resources, a query execution context associated with the first query, the query execution context comprising a traversal path indicating one or more resources or relationships that are traversed while executing the first query; and
   providing the query execution context to at least one of the one or more other graph subparts of the graph, the query execution context enabling continued execution of the first query in the at least one of the one or more other graph subparts.

2. The system of claim 1, wherein executing the first query in the graph subpart of the plurality of graph subparts comprises:
   identifying, based on the first query, the graph subpart from the plurality of graph subparts based on determining a parameter of the first query is present in the graph subpart.

3. The system of claim 1, wherein generating the query execution context and providing the query execution context is performed based on a determination that an intermediate result comprises the one or more cross-graph reference resources.

4. The system of claim 3, wherein the intermediate result comprises one or more partial matches for the first query, wherein a partial match comprises content identified in the graph subpart and stored in at least one of the one or more other graph subparts.

5. The system of claim 3, wherein the intermediate result comprises the one or more cross-graph reference resources.

6. The system of claim 1, wherein the set of operations further comprises:
generating a compiled query for the first query, wherein the compiled query is executable in a virtual machine.

7. The system of claim 1, wherein the query execution context comprises a security context indicating access control information for the information in the graph.

8. The system of claim 1, the set of operations further comprising:
executing the first query in the at least one of the one or more other graph subparts;
identifying, in the at least one of one or more other graph subparts, a set of resources satisfying the first query, the set of resources including at least one resource corresponding to the one or more cross-graph reference resources; and
providing at least the set of resources in response to the first query.

9. A computer-implemented method comprising:
receiving a first query for information in a first graph subpart of a graph, the first query indicating an anchor resource to be used when executing the first query to identify a context or a starting resource for evaluating the first query;
traversing the first graph subpart to generate a traversal path associated with the first query, wherein the traversal path is comprised of one or more first resources and one or more relationships;
determining whether a first resource of the traversal path is a cross-graph reference resource associated with a second graph subpart of the graph, the cross-graph reference resource comprising at least one of:
a second query used to identify a second resource in the second graph subpart;
a subpart identifier used to identify the second graph subpart; or
a property identifier used to identify one or more properties associated with the second resource;
based on determining that the first resource of the traversal path is the cross-graph reference resource, storing the traversal path in a traversal path data structure for transmission to the second graph subpart; and
based on determining that the first resource of the traversal path is not the cross-graph reference resource, providing the traversal path as a result to the first query.

10. The computer-implemented method of claim 9, wherein the first query comprises execution context information, and wherein traversing the first graph subpart comprises evaluating the first graph subpart from one or more second resources identified in the execution context information.

11. The computer-implemented method of claim 10, wherein the execution context information comprises the traversal path data structure.

12. The computer-implemented method of claim 10, wherein the execution context information comprises a security context indicating access control information for the information in the graph.

13. The computer-implemented method of claim 9, wherein the first query is received from another graph subpart.

14. The computer-implemented method of claim 9, further comprising generating a compiled query for the first query, wherein the compiled query is executable in a virtual machine.

15. A computer-implemented method comprising:
receiving a first query for information stored in a graph comprising a plurality of graph subparts;
identifying a first graph subpart from the plurality of graph subparts;
traversing the first graph subpart to generate a traversal path associated with the first query, wherein the traversal path is comprised of one or more first resources and one or more relationships;
determining a first resource of the traversal path is a cross-graph reference resource associated with a second graph subpart of the graph, the second graph subpart storing one or more properties for a second resource corresponding to the cross-graph reference resource, the second resource being stored in the second graph subpart, the one or more properties not being stored in the graph subpart, the cross-graph reference resource comprising at least one of:
a second query used to identify the second resource;
a subpart identifier used to identify the second graph subpart; or
a property identifier used to identify the one or more properties for the second resource;
generating a query execution context associated with the first query comprising at least a part of the traversal path and at least a part of the first query; and
providing, to the second graph subpart, the query execution context for continued execution of the first query in the second graph subpart.

16. The computer-implemented method of claim 15, wherein the first query comprises execution context information, and wherein traversing the first graph subpart comprises evaluating the first graph subpart based on one or more second resources identified in the execution context information.

17. The computer-implemented method of claim 15, further comprising:
based on determining that the first resource of the traversal path is not the cross-graph reference resource, providing the traversal path as a result to the first query.

18. The computer-implemented method of claim 15, wherein identifying the first graph subpart comprises identifying the first graph subpart based on determining a parameter of the first query is present in the first graph subpart.

19. The computer-implemented method of claim 15, further comprising generating a compiled query for the first query, wherein the compiled query is executable in a virtual machine.

20. The computer-implemented method of claim 15, wherein the query execution context comprises a security context indicating access control information for the information in the graph.

* * * * *